Aug. 19, 1941.
F. A. GRANETZ
2,252,923
VALVE
Filed March 14, 1941
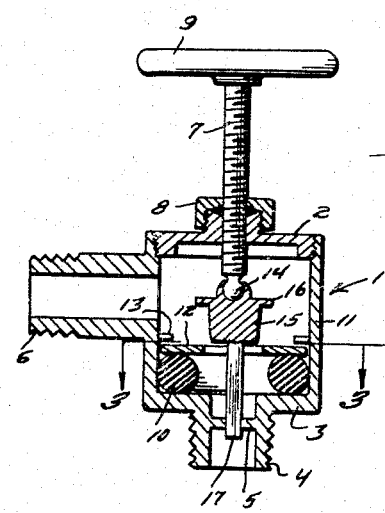
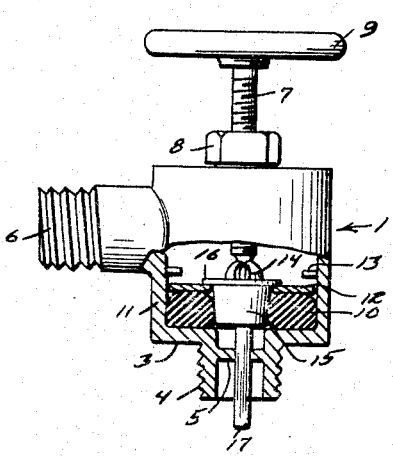
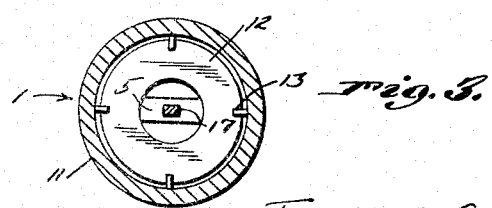
Inventor
Frank A. Granetz
By Clarence A. O'Brien
Attorney Patented Aug. 19, 1941

2,252,923

UNITED STATES PATENT OFFICE 2,252,923

VALVE

Frank A. Granetz, Huntington, N. Y.

Application March 14, 1941, Serial No. 383,435

1 Claim. (Cl. 251—27)

The present invention relates to new and useful improvements in valves and has for its primary object to provide, in a manner as hereinafter set forth, a device of this character which comprises novel closing and sealing means.

Another very important object of the invention is to provide a valve of the aforementioned character wherein there will be comparatively little or no wear on the closing and sealing elements.

Other objects of the invention are to provide a valve of the character described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in vertical section through a valve constructed in accordance with the present invention, showing said valve open.

Figure 2 is a view partially in vertical section, showing the valve closed.

Figure 3 is a view in horizontal section, taken substantially on the line 3—3 of Figure 1.

Referring now to the drawing in detail, it will be seen that the embodiment of the invention which has been illustrated comprises a substantially cup-shaped casing of suitable material which is designated generally by the reference numeral 1. Threadedly mounted in the upper portion of the casing 1 is a removable closure 2. Depending from the bottom 3 of the casing 1 is an outlet nipple 4. An apertured guide 5 traverses the nipple 4, the purpose of which guide will be presently set forth. Projecting from an upper portion of a casing 1 is an inlet nipple 6.

Threaded through the removable closure 2 of the casing 1 is a stem 7. A suitable packing 8 is provided for preventing leakage around the stem 7. Mounted on the upper end portion of the stem 7 is an operating wheel 9.

Mounted in the lower portion of the casing 1 and resting on the bottom 3 thereof is a resilient annular gasket or ring 10 of live rubber or other suitable material. The peripherly of the ring 10 contacts the walls 11 of the casing 1. Resting on the resilient ring 10 is a flat annulus 12 of suitable material. Stops 13 in the casing 1 positively limit upward movement of the annulus 12.

Connected by a universal joint 14 to the lower end of the stem 7 is a substantially frusto-conical valve head 15 which is operable in the annulus 12. On the upper portion of the valve head 15 is a flange 16 which is engageable with the annulus 12 for forcing same downwardly in a manner to distort and radially bulge the resilient sealing gasket or ring 10. Depending from the valve head 15 is a shank 17 of polygonal cross section which is slidable in the correspondingly shaped aperture in the guide 5 for preventing rotation of said head 15 and for confining the movement thereof to a true vertical plane.

It is thought that the operation of the device will be readily apparent from a consideration of the foregoing. Briefly, when the stem 7 is screwed downwardly in the casing 1, the head 15 passes through the annulus 12 into the ring 10. The flange 16 engages the annulus 12 and forces said annulus downwardly on the resilient ring 10. Thus, the resilient ring 10 is compressed vertically and expanded or bulged radially into engagement with the head 15 and the walls 11 of the casing 1 for closing and sealing the valve. When the stem 7 is threaded upwardly in the casing 1 the head 15 with the flange 16 thereon are elevated and the resilient ring 10 returns to its normal shape. This is shown to advantage in Figure 1 of the drawing. As the valve is opened and closed the shank 17 slides vertically in the guide 5.

It is believed that the many advantages of a valve constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed. For example, any suitable means other than the manually actuated arrangement shown, such as hydraulic or air pressure, may be utilized for actuating the valve head and compressing the resilient sealing ring.

What is claimed is:

A valve of the class described comprising a substantially cup-shaped casing including a bottom, an outlet nipple depending from said bottom, an apertured guide traversing said nipple, the casing further having an inlet in its upper portion, a removable closure threadedly mounted in the upper portion of the casing, a stem threaded through said closure into the casing, an actuating wheel on the upper end of said stem, a distortable ring mounted in the casing and resting on the bottom thereof, a substantially flat annulus mounted in the casing and resting on said resilient ring, a substantially frusto-conical valve head rotatably mounted on the lower end of the stem and movable thereby through the annulus into the resilient ring, a flange on said head engageable with the annulus for actuating same in one direction for distorting the resilient ring and engaging same with said head and the casing for closing and sealing the space therebetween, and a shank depending from the head and slidably engaged in the guide.

FRANK A. GRANETZ.